Jan. 5, 1937.  S. W. MONTGOMERY  2,066,735
BRIDGE FOR EYEGLASSES
Filed Aug. 23, 1935

Inventor:
Stanley W. Montgomery,
By Dyrenforth, Lee, Chritton & Wiles,
Attys

Patented Jan. 5, 1937

2,066,735

UNITED STATES PATENT OFFICE 2,066,735

BRIDGE FOR EYEGLASSES

Stanley W. Montgomery, Akron, Ohio, assignor to Standard Safety Equipment Co., Chicago, Ill., a corporation of Illinois Application August 23, 1935, Serial No. 37,568

1 Claim. (Cl. 88—43)

This invention relates particularly to eye glasses, and more particularly to an improved flexible bridge.

The primary object of the invention is to provide a bridge for a pair of eye glasses, spectacles, or goggles, which will form a comfortable support for the same on the nose of a wearer.

A further object of the invention is to provide a simple and inexpensive bridge which may be used in combination with the connecting means of the frame proper, so that the metal work of the frame will not come in contact with the nose or face of the wearer.

The invention is particularly useful in connection with protective glasses which serve to shield the workman from intense heat, as in front of a furnace, for example. The bridge, preferably, is made of rubber, or some other soft and flexible material, which is a good insulator. The material of the bridge, being a poor conductor of heat, protects the wearer from conduction of heat through the frame of the glasses.

Another advantage of the improved bridge is in that it forms a yielding support and reduces the danger of breakage from impact.

The invention is illustrated in a preferred embodiment in the accompanying drawing, in which—

Figure 1:
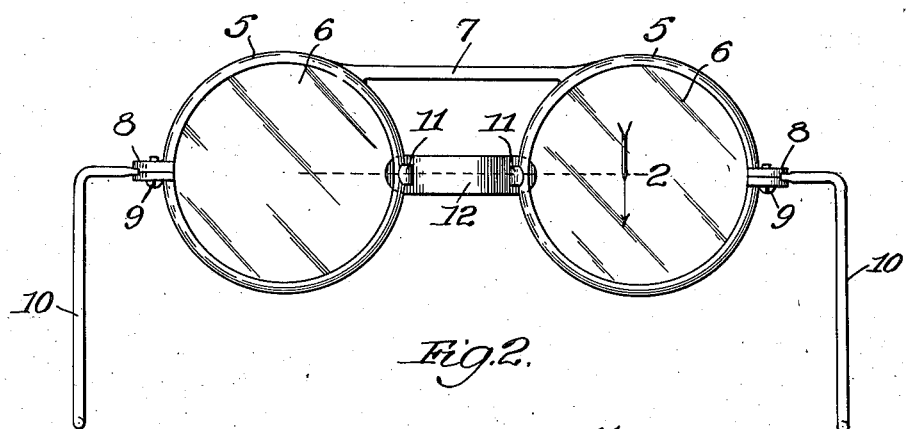
Fig. 1 is an elevational view of a pair of spectacles embodying the invention.
Figure 2:
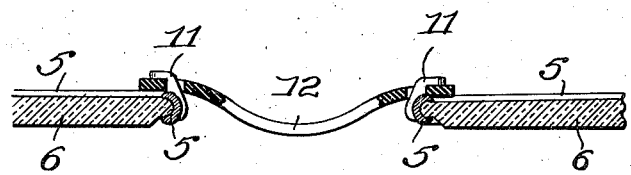
Fig. 2 is a broken sectional view taken as indicated at line 2 of Fig. 1.
Figure 3:
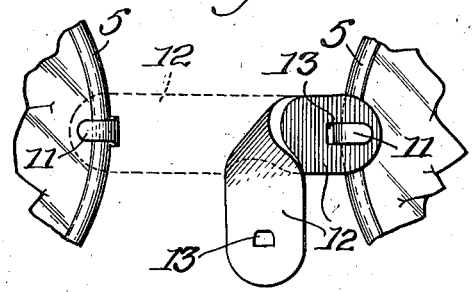
Fig. 3 is an enlarged broken rear elevational view showing how the bridge is connected to the frame.

In the embodiment illustrated, a frame 5 provides a mounting for a pair of lenses 6, and preferably has a connecting cross-bar 7 which serves to hold the eye glasses in spaced relation. The frames may be opened at their hinged portions 8 by means of screws 9, to admit the lenses in the well known manner. The frames are also shown provided with the usual bows or temple members 10 for securing the glasses to the head of the wearer.

As shown in the drawing, the frames are provided near the adjacent edge portions of the lenses with studs or hooks 11, upon which the bridge 12 is mounted. As will be readily understood, the end portions of the bridge strap are provided with perforations 13 which may slip over the studs 11. Preferably, the studs 11 are arranged in line with the hinged portions 8, but they may be placed at any convenient part of the frame 5.

Rubber has been found to be the most satisfactory material for the bridge strap, due to its insulating properties and ability to distort itself. However, it will be understood that leather or any suitable flexible fabric may be used.

If desired, the eye glass frames may be connected by a small chain, or other means commonly employed in goggles, but preferably a rather stiff cross-bar, as illustrated in Fig. 1, is used.

The foregoing detailed description is given for clearness of understanding only, and no unnecessary limitations should be understood therefrom, but the appended claim should be construed as broadly as permissible, in view of the prior art.

I claim:

A pair of spectacles comprising: a frame having a pair of rim-members rigidly connected together at their top edge portion by means of a horizontal cross bar; temple members hinged to the lateral outer edge portion of said rim members for holding the spectacles on the head of the wearer; a short stud member rigidly secured to the lateral edge portion of each rim member near the center of the frame, each stud having a head projecting rearwardly towards the wearer; a removable flexible strap of heat insulating material provided at each end with apertures adapted to be stretched over said heads so as to be impaled by the studs and form a bridge for supporting the frame on the nose of the wearer; and glasses mounted in each of said rim members.

STANLEY W. MONTGOMERY.